United States Patent
Tsai et al.

(10) Patent No.: US 8,247,334 B2
(45) Date of Patent: Aug. 21, 2012

(54) MOISTURE-VAPOR-PERMEABLE AND WATER-RESISTANT FIBER

(75) Inventors: Chiu-Shiung Tsai, Taipei (TW);
Kun-Lung Chuang, Taipei (TW);
Fong-Ying Tien, Taipei (TW);
Mou-Chuan Huang, Taipei (TW)

(73) Assignee: G-Fun Industrial Corporation, Guan Yin Industrial District, Taoyuan County (TW)

( * ) Notice: Subject to any disclaimer, the term of this patent is extended or adjusted under 35 U.S.C. 154(b) by 1054 days.

(21) Appl. No.: 11/876,782

(22) Filed: Oct. 23, 2007

(65) Prior Publication Data
US 2008/0188152 A1 Aug. 7, 2008

(30) Foreign Application Priority Data
Feb. 2, 2007 (TW) ................. 96202005 U

(51) Int. Cl.
*B32B 5/18* (2006.01)
*B32B 5/02* (2006.01)
*B32B 23/02* (2006.01)

(52) U.S. Cl. .............. 442/76; 442/77; 442/79; 442/164; 442/165

(58) Field of Classification Search ................... 442/76, 442/77, 79, 164–165
See application file for complete search history.

(56) References Cited

FOREIGN PATENT DOCUMENTS
WO    WO 03/087452    * 10/2003
* cited by examiner

*Primary Examiner* — Lynda Salvatore

(57) ABSTRACT

A moisture-vapor-permeable and water-resistant fiber involves a layer of base fabric, a moisture-vapor-permeable layer, and a water absorption layer. The moisture vapor permeable layer is obtained by coating or laminating the inner side of the fabric with a moisture-vapor-permeable resin, which prohibits the penetration of the water droplets but allows the penetration of the moisture vapor molecules. The moisture absorption layer with intricate and colorful design is composed of binding resin blended with fiber powder and/or inorganic powder, and which is dot-coated or dot-printed onto the inner side of the moisture-vapor-permeable and water-resistant layer. The fiber powder or inorganic powder is highly hydrophilic and highly absorbent in its moisture absorption ability, which, when the clothes are fabricated, can prevent the penetration of raindrops but allows the transmission of the evaporated vapor of sweat through the fabric. Moreover, it is capable of absorbing plentiful amount of sweat.

19 Claims, 2 Drawing Sheets

MOISTURE-VAPOR-PERMEABLE AND WATER-RESISTANT FIBER

FIELD OF THE INVENTION

The present invention is related to base fabrics, and especially to the moisture-vapor-permeable fabric of lightweight non-stickiness, and lightly swelling as it directly contacts with water.

BACKGROUND OF THE INVENTION

The structure of the generally known moisture-vapor-permeable and water-resistant fabric, as depicted in FIG. 2, are mainly composed of a layer of base fabric (4), and a moisture-vapor-permeable and water-resistant layer. The moisture-vapor-permeable and water-resistant layer is made by coating or laminating with a water-resistant layer onto the inner layer of the base fabric.

However, even the waterproof layer having the nano-microporous property, which prohibits the penetration of raindrops from outside and permits the permeability of moisture vapor from inside of fabric, does not display the property of moisture absorption and quick drying properties. Thereby, the water-resistant layer, having prohibited the raindrops and allowing the moisture vapor of body sweat passing through the fabric, will be incapable of expelling the moisture vapor of sweat from the body as the body sweat congregates and condenses into larger water particles. Thus, the fabric will not be dry, clean, and comfortable to wear. Additionally, the fully-coated water-resistant layer onto the inside of the base fabric (4) will not be three dimensional in its structure. (5) Another disadvantage is that the water-resistant resin, as it is formed into the water-resistant layer, will be easily sticky to the human skin and sticky to itself. Thereafter, as the coated fabric is used for making clothing, a layer of liner is needed in the fabric inner side to prevent stickiness, which will largely increase the cost.

As a result of the abovementioned defects and inconvenience, the inventor has improved the technique and performed a series of experiments to validate this current invention.

SUMMARY OF THE INVENTION

The primary object of the invention is to provide a preferred moisture-absorptive, quick-drying and non-sticky, and lower cost process with which moisture-vapor-permeable and water-resistant fabric can have new structural modification.

Practically, this invention denotes that a moisture-vapor-permeable and water-resistant fabric with a new structural modification includes a base fabric layer, a moisture-vapor-permeable and water-resistant layer, and a moisture absorption layer. The moisture-vapor-permeable and water-resistant layer is made by coating or laminating with a water-resistant binding resin onto the inner layer of the base fabric, which is impermeable to the water droplets, and which is permeable to the moisture vapor. The moisture absorption layer with colorful design is composed of binding resin blended with fiber powder and/or inorganic powder, and which is dot-coated or printed on the inner side of the moisture-vapor-permeable and water-resistant layer. The fiber powder or inorganic powder is highly hydrophilic and absorbent in its high moisture absorption ability.

Thereafter, as the moisture-vapor-permeable and water-resistant fabric is made into clothing, the moisture-vapor-permeable and water-resistant layer can prevent the penetration of raindrops from entering the fabric while it can expel the moisture vapor produced from body sweat through the fabric into the air. Moreover, the highly hydrophilic and high-moisture-absorption fiber powder and/or inorganic powder added in the binding resin are capable of absorbing large amount of sweat. The absorbed sweat moisture will be transformed into smaller water particles, which will be expelled from the body into the air through the fabric. The result is that, even in case of large amount of sweat produced, the body will not be sticky but rather it will be very comfortable to wear this type of clothing. The coated fabric with non-stickiness and three-dimensional structure can also saves the cost of liner The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
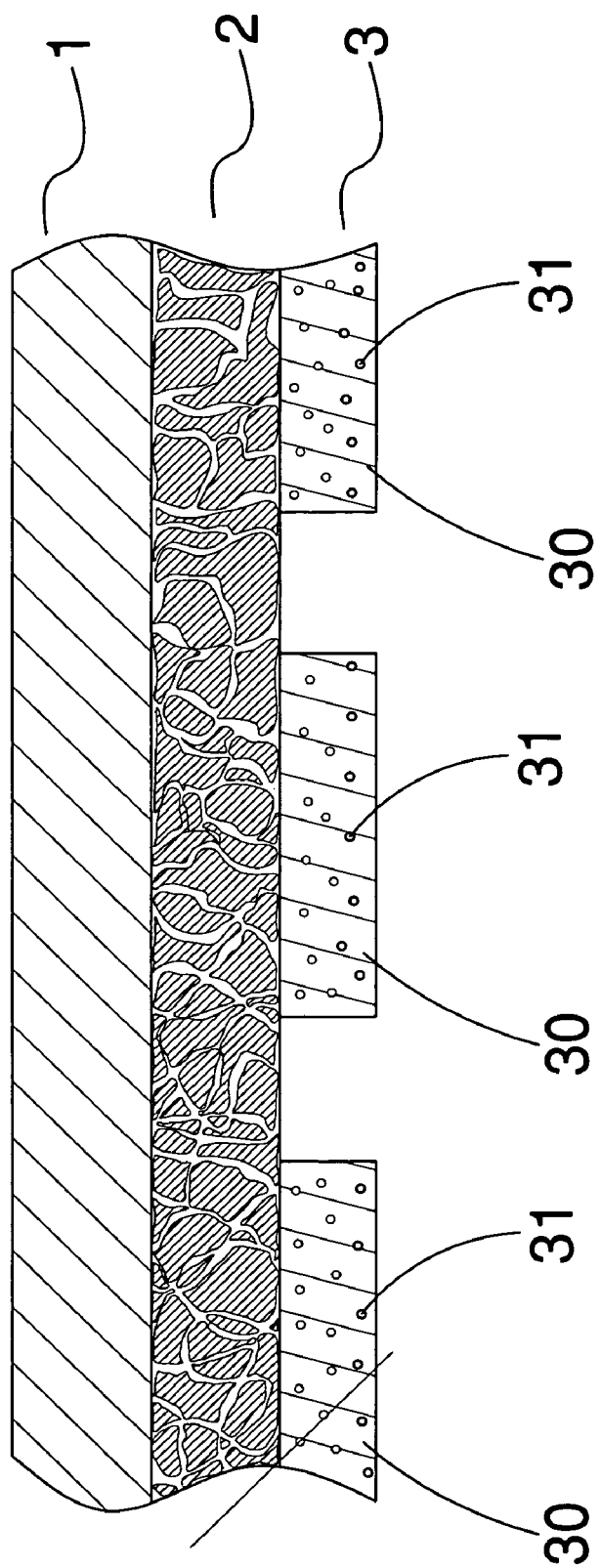
FIG. 1 is a cross sectional view of the present invention.
Figure 2:
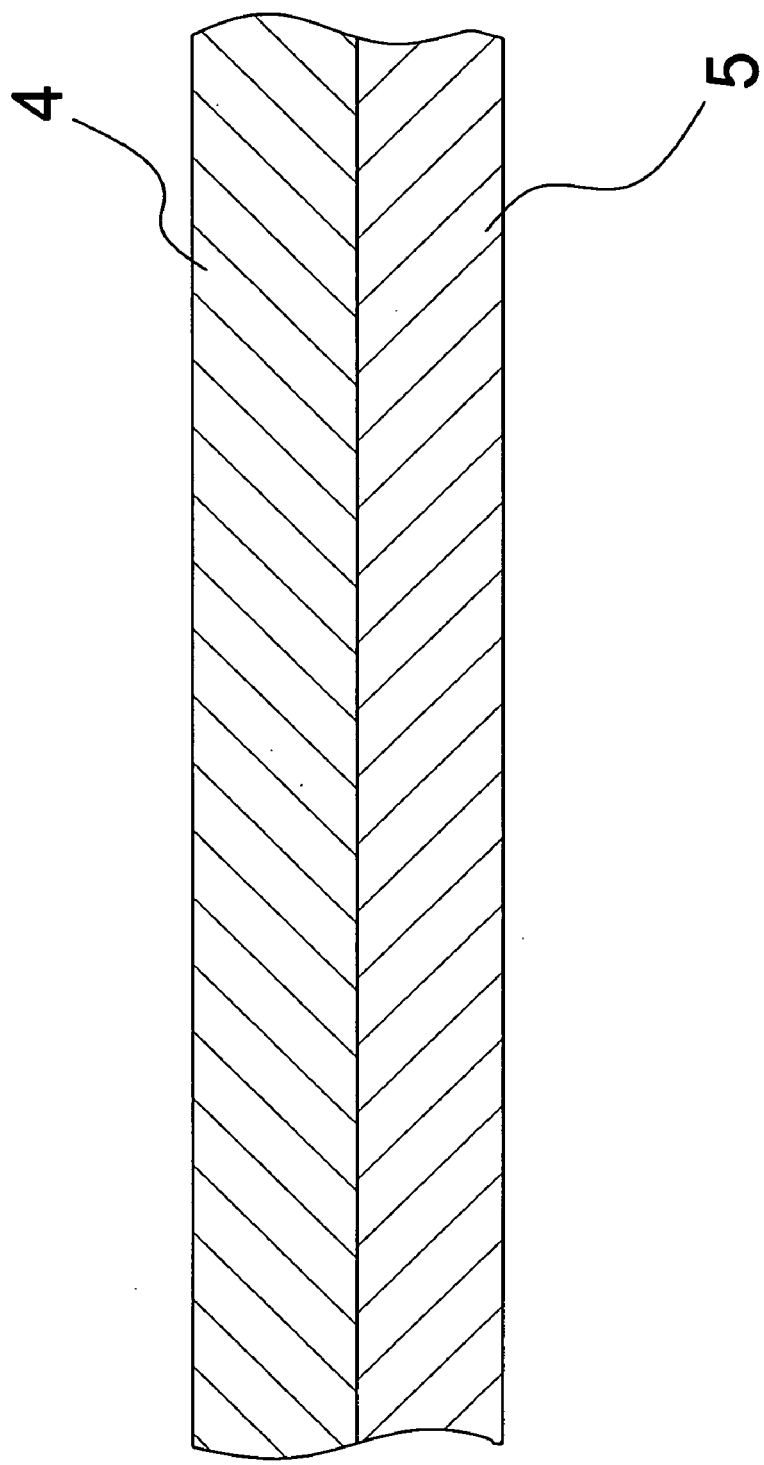
FIG. 2 is a cross sectional view of the prior art.

Refer to FIG. 1, this invention denotes the structural modification of moisture-vapor-permeable and water-resistant fabrics with a structure of a base fabric 1;
a moisture-vapor-permeable and water-resistant layer 2 being below the basic fabric 1, and
a moisture absorption layer 3 positioned below the moisture-vapor-permeable and water-resistant layer 2.

The base fabric 1 mentioned above can be any one, and not limited to, of the following types of fabrics: nylon, polyester, polypropylene, polyacrylonitrile, cotton, T/C blended, rayon, silk, linen, and wool.

The moisture-vapor-permeable and water-resistant layer is made by coating or laminating with a water-resistant resin onto the inner layer of the base fabric, which is impermeable to the water droplets, and which is permeable to the moisture vapor;

The moisture absorption layer is composed of binding resin blended with fiber powder and/or inorganic powder, which is dot-coated or dot-printed on the inner side of the moisture-vapor-permeable and water-resistant layer. This method of coating or printing allows the passage of moisture vapor through gaps between these dots while the roomy space between the dots will be more effective in the water absorption. The fiber powder or inorganic powder (31) is highly hydrophilic in nature and is capable of absorbing extensive amount of water molecules. The fiber powder possessing such property can be made from any one of the following natural fibers: cotton, linen, silk and wool; while the inorganic powder possessing such property can be calcium chloride, titanium oxide, silica, magnesium hydroxide, calcium hydroxide, calcium carbonate, and calcium oxide, etc.

As a result of the above mentioned structural modification of this invention, the advantages of this invention can be listed as:

The fiber powder or inorganic powder of the moisture absorption layer is hydrophilic in nature and is highly moisture-absorbing; thereby the inner side of the moisture-vapor-permeable and water-resistant fabric is moisture-absorbing, quick-drying, and comfortable to wear. These types of fabrics are very suitably used as leisure-wear or sports-wear material.

The moisture absorption layer is composed of binding resin (30) blended with fiber powder and/or inorganic powder, which is dot-coated or dot-printed on the inner side of the moisture-vapor-permeable and water-resistant layer. This method of coating or printing allows the passage of moisture vapor through gaps between these dots while the roomy space between the dots will be more effective in the water absorption. The fiber powder or inorganic powder (31) is highly hydrophilic in nature and is capable of absorbing extensive amount of water molecules. The fiber powder possessing such property can be made from any one of the following natural fibers: cotton, linen, silk and wool; while the inorganic powder possessing such property can be calcium chloride, titanium oxide, silica, magnesium hydroxide, calcium hydroxide, calcium carbonate, and calcium oxide, etc.

The fiber powders or inorganic powders blended in the moisture absorption layer will have the effect of making the moisture-vapor-permeable and water-resistant fabric non-sticky to the human skin and sticky with itself. Thus, the spending on liner for outdoor dresses can be saved and storage of the outdoor dresses can be longer and safer.

The fiber powder or inorganic powder blended in the moisture absorption layer is capable of increasing the moisture vapor absorption of the moisture-vapor-permeable and water-resistant fabrics.

As a summary of the aforementioned statements, it is known that the new methods disclosed in this invention can be utilized for online production and disclose new formulations used for production. No similar products have been produced or announced in this category; thereby this invention meets all the requirements filed as an application for a new model patent.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A moisture-vapor-permeable and water-resistant fabric comprising:
   a base fabric;
   a moisture-vapor-permeable and water-resistant layer disposed below the base fabric, which is made by coating or laminating onto the inner side of the base fabric with a moisture-vapor-permeable and water-resistant resin, by using the moisture-vapor-permeable and water-resistant layer, the base fabric is non-permeable to the water droplets but permeable to the water moisture vapor; and
   a moisture absorption layer disposed below the moisture-vapor-permeable and water-resistant layer; and composed of binding resin blended with fiber powders and/or inorganic powders, and which is coated or printed on the inner side of the water-resistant layer; the fiber powders or inorganic powders being highly hydrophilic and highly absorbent in its moisture absorption ability.

2. The moisture-vapor-permeable and water-resistant fabric of claim 1, wherein said water-resistant binding resin contains 1-30% of fiber powder or inorganic powder, with particle sizes of 1~1000 um.

3. The moisture-vapor-permeable and water-resistant fabric of claim 1, wherein said fiber powders are natural fibers.

4. The moisture-vapor-permeable and water-resistant fabric of claim 3, wherein said natural fiber powders are selected from one of cotton, linen, silk, and wool.

5. The moisture-vapor-permeable and water-resistant fabric of claim 2, wherein said inorganic powders contain calcium, magnesium, titanium, or silicone.

6. The moisture-vapor-permeable and water-resistant fabric of claim 2, wherein said inorganic powders contain calcium chloride, CaCl2.

7. The moisture-vapor-permeable and water-resistant fabric of claim 2, wherein said inorganic powders contain at least one of magnesium, chloride, titanium oxide, silica, magnesium hydroxide, and calcium hydroxide.

8. The moisture-vapor-permeable and water-resistant fabric of claim 2, wherein said inorganic powders contain calcium carbonate.

9. The moisture-vapor-permeable and water-resistant fabric of claim 1, wherein said moisture absorption layers are composed of binding binding resin blended with fiber powders and/or inorganic powders, and are dot-coated or dot-printed, with intricate color design, onto the inner side of the water-resistant layer.

10. The moisture-vapor-permeable and water-resistant fabric of claim 1, wherein the base fabric is made of nylon.

11. The moisture-vapor-permeable and water-resistant fabric of claim 1, wherein the base fabric is made of rayon.

12. The moisture-vapor-permeable and water-resistant fabric of claim 1, wherein the moisture-vapor-permeable and water-resistant resin is wet-coagulated microporous polyurethane.

13. The moisture-vapor-permeable and water-resistant fabric of claim 1, wherein the moisture-vapor-permeable and water-resistant resin is microporous polyester.

14. The moisture-vapor-permeable and water-resistant fabric of claim 1, wherein the binding resin is emulsion acrylic.

15. The moisture-vapor-permeable and water-resistant fabric of claim 1, wherein the binding resin is microporous polyester.

16. The moisture-vapor-permeable and water-resistant fabric of claim 1, wherein the binding resin is microporous waterborne polyurethane.

17. The moisture-vapor-permeable and water-resistant fabric of claim 1, wherein the binding resin is hydrophilic polyurethane.

18. The moisture-vapor-permeable and water-resistant fabric of claim 1, wherein the binding resin is hydrophilic acrylic.

19. The moisture-vapor-permeable and water-resistant fabric of claim 1, wherein the binding resin is hydrophilic polyester.

* * * * *